United States Patent [19]
Van Ostrom

[11] 3,982,510
[45] Sept. 28, 1976

[54] THROTTLE MOTION CONTROL DEVICE

[75] Inventor: David L. Van Ostrom, Flint, Mich.

[73] Assignee: General Motors Corporation, Detroit, Mich.

[22] Filed: Aug. 15, 1975

[21] Appl. No.: 605,143

[52] U.S. Cl. .................. 123/103 E; 123/103 R; 180/108; 180/109
[51] Int. Cl.² .................................. F02D 11/08
[58] Field of Search .................. 180/108, 109; 123/103 R, 103 E, 108, 97 R

[56] References Cited
UNITED STATES PATENTS

| 3,021,827 | 2/1962 | Brunner | 123/103 R |
| 3,133,610 | 5/1964 | Sheppard | 123/103 R X |

Primary Examiner—Charles J. Myhre
Assistant Examiner—William Anderson
Attorney, Agent, or Firm—Arthur N. Krein

[57] ABSTRACT

A throttle motion control device for an automotive vehicle engine that is adapted to warn the driver of the vehicle to avoid operation of the engine in a manner to cause excessive fuel consumption by providing a stiff accelerator pedal feel when manifold vacuum pressure drops below predetermined values, the throttle motion control device including a vacuum motor operatively connected to the accelerator pedal and adapted to be actuated by a vacuum signal to apply a predetermined force on the accelerator pedal in a direction opposite to that applied by the driver to open the throttle, a first vacuum switch and a second vacuum switch being connected in series between a source of engine vacuum and the vacuum motor to control the flow of vacuum signals to the vacuum motor, the first vacuum switch being connected to the source of engine vacuum and by a conduit to the second vacuum switch, the conduit having an orifice therein controlling flow between the first and second vacuum switches, this conduit also having a bleed orifice therein open to the atmosphere and, the second vacuum switch being connected to the vacuum motor by a second conduit having a flow control orifice therein and a bleed orifice to the atmosphere.

3 Claims, 3 Drawing Figures

U.S. Patent    Sept. 28, 1976    3,982,510
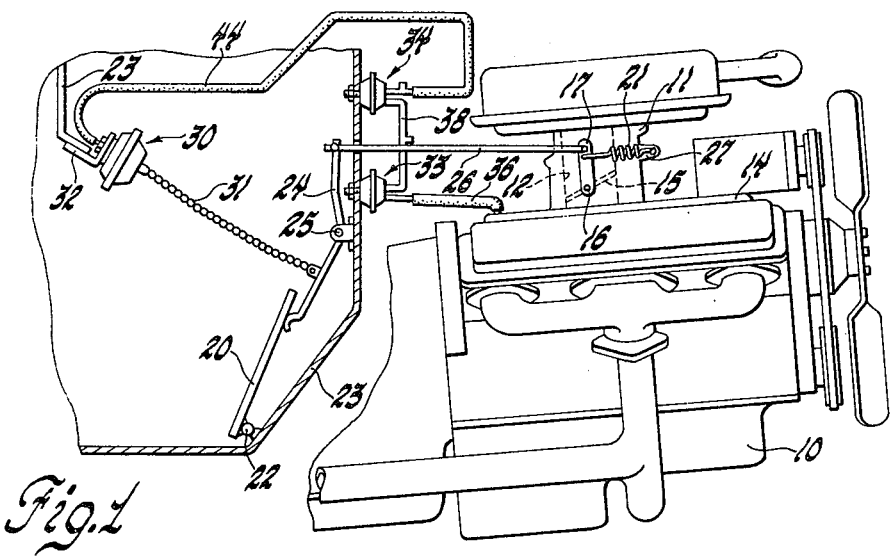
Fig.1
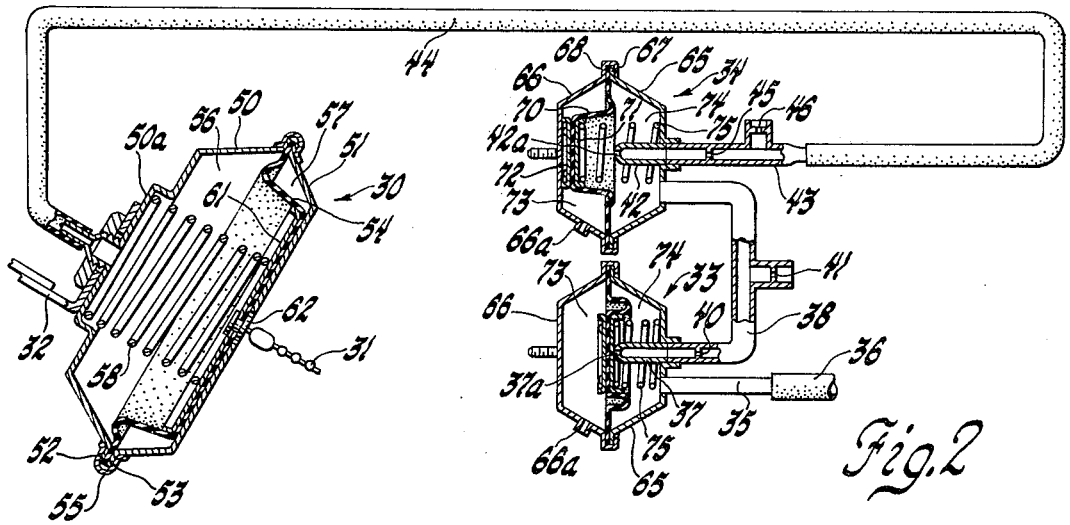
Fig.2
Fig.3

THROTTLE MOTION CONTROL DEVICE

This invention relates to a throttle control for an automotive vehicle engine and, in particular, to a throttle motion control device with override for such an engine.

Many automobile drivers operate the accelerator pedal much too rapidly during acceleration whereby the engine is not operated in the most economical manner. That is, the operator may effect a too rapid opening of the throttle valve which causes the manifold vacuum to drop below an efficient operating vacuum range. As is well known, when the manifold vacuum drops below this range, the fuel consumption increases rapidly and, of course, the engine is then not operated in an economical manner.

In an effort to permit the average or unskilled driver to save fuel, various warning devices have been proposed which are operative to provide a visual signal to the driver to indicate, for example, when the vehicle is not being operated in an economical manner, but such a signal must be observed by the driver to be effective. In addition, various throttle control devices have been proposed to compensate for the erratic or sudden operation of the accelerator pedal by the vehicle operator as, for example, by applying a resistance to opening movement of the accelerator under certain engine operating conditions but, in such known devices, this resistance force will vary in accordance with the operating condition of the engine.

It is therefore the primary object of this invention to provide a throttle motion control device operative to provide a signal, of a predetermined maximum force, through the accelerator pedal to warn the driver of an automotive vehicle when he is operating the engine of the vehicle in an uneconomical manner, which force signal can be overridden by the operator, after which a secondary force signal is given to the driver, which secondary force signal can also be overridden by the driver.

Another object of this invention is to provide a throttle motion control device in which a vacuum motor connected to the throttle linkage provides a feedback signal to the accelerator pedal of the vehicle to present a solid wall feel on the accelerator pedal when the driver is accelerating at a maximum economical rate of fuel consumption, the vacuum motor being connected to a source of engine vacuum through a pair of series connected vacuum switches, and flow control conduits whereby primary and secondary signals are provided at different preselected engine vacuum pressures.

These and other objects of the invention are obtained by means of a throttle motion control device in which a pair of vacuum switches are connected in series between a source of engine intake vacuum pressure and a vacuum motor, the vacuum motor being operatively connected to the accelerator pedal of a vehicle to apply a predetermined force on the vehicle accelerator pedal in a direction opposite to that applied by the driver to effect opening movement of the throttle for the engine. The vacuum switches and the connecting conduit between these switches and between one of the switches and the vacuum motor being operative to control the flow of vacuum pressure to the vacuum motor to effect actuation of the vacuum motor at pre-selected engine vacuum pressures.

For a better understanding of the invention, as well as other objects and further features thereof, reference is had to the following detailed description of the invention to be read in conjunction with the accompanying drawings, wherein:

FIG. 1 is a schematic illustration of the internal combustion engine of a vehicle and the throttle control thereof with a throttle motion control device in accordance with the invention incorporated therein;

FIG. 2 is an enlarged, somewhat schematic, view with parts in section of the throttle motion control device of FIG. 1 and showing the position of the various elements during steady state engine operation; and, FIG. 3 is a graph showing the functional characteristics of the subject throttle motion control device.

Referring first to FIG. 1, there is shown the internal combustion engine 10 of a vehicle having a carburetor 11 providing an induction passage 12 in communication with the intake manifold 14 of the engine. A throttle 15, mounted on a throttle shaft 16, is pivotally disposed in the induction passage 12 and is controlled by a throttle lever 17 fixed to the shaft 16. Opening movement of the throttle 15 is effected by the usual driver actuated accelerator pedal 20, while the usual throttle return spring 21 is used to effect closing movement of the throttle.

In the embodiment shown schematically in FIG. 1, the foot operated accelerator pedal 20 is pivotally mounted at one end at 22 to the vehicle support panel 23 in position to have its other end in abutment against one end of a pivot lever 24 that is pivotally mounted intermediate its ends in a pivot support 25 fixed to the support panel 23, the opposite end of the pivot lever 24 being connected to one end of the accelerator rod 26 which extends through the support panel 23 and has its other end pivotally connected to the throttle lever 17. The throttle return spring 21 is shown as being connected at one end to the throttle lever 17 and at its other end to a fixed support 27 on the engine.

As shown in FIG. 1, the accelerator pedal 20, which is normally pivoted by the driver or operator in a clockwise direction, with reference to FIG. 1, to effect opening of the throttle 15 against the biasing action of the spring 21, is also operatively connected to the throttle motion control device of the invention whereby under certain engine operating conditions, as described hereinafter, a predetermined force is applied against the accelerator pedal in a direction opposite to that in which the accelerator pedal is moved by the operator to effect opening of the throttle.

In the embodiment disclosed, this force, as provided by a pneumatic power unit or vacuum motor, generally designated 30, of the throttle motion control device, is applied by means of a flexible beaded chain 31 connected at one end to the movable power element of vacuum motor 30 and connected at its other end to the lever 24 intermediate the end of this lever engaged by the accelerator pedal 20 and the pivotal support 25, the housing of the vacuum motor 30 being fixed as by a support 32 to the support panel 23.

The throttle motion control device of the invention also includes a pair of vacuum control valves or vacuum switches, hereinafter referred to as vacuum switches, generally designated 33 and 34, connected in series between a source of engine vacuum and the vacuum motor 30 and mounted in a suitable manner to a fixed support element, for example, to the support panel 23.

Vacuum switch 33 is provided with an inlet conduit 35 connected by a hose 36 to the intake manifold 14 whereby this switch is supplied with engine intake vacuum pressure downstream of the throttle valve 15. Vacuum switch 33 is also provided with an outlet conduit 37 connected by conduit 38 to the inlet of vacuum switch 34, the conduit 38 being provided, next adjacent to the outlet from vacuum switch 33, with a flow orifice 40 therein and with a bleed orifice passage 41 to the atmosphere located between the orifice passage 40 and the inlet of vacuum switch 34. In a similar manner, vacuum switch 34 is provided with an outlet conduit 42 that is connected by a conduit 43 and a hose 44 to the vacuum motor 30 the conduit 43 being provided, next adjacent to the outlet from vacuum switch 34, with a flow orifice 45 therein and with a bleed orifice passage 46 to the atmosphere that is located between the orifice 45 and vacuum motor 30.

Referring now to FIG. 2, the power unit or vacuum motor 30 can be of any desired configuration having a housing divided into a pair of chambers by a movable wall and, in the embodiment disclosed, is a diaphragm unit. As shown, the vacuum motor 30 includes a housing made of two generally cupshaped metal housing or casing halves 50 and 51 which have flanges 52 and 53, respectively, between which the periphery of a flexible diaphragm 54 is interposed, a metal band clip 55 encircling the flanges to secure these elements together in unit assembly.

The housing half 50 is rigidly fixed in a suitable manner, as by bracket 32, to a portion of the vehicle support panel 23.

The diaphragm 54 divides the housing of the vacuum motor into two chambers, a vacuum chamber 56 and a pressure chamber 57 and, the diaphragm is normally biased to the position shown in FIG. 2 against the end wall of the housing half 51 by means of a coiled spring 58 positioned within the vacuum chamber side of the housing with one end of the spring abutting against a centrally depressed portion 50a of the housing half 50 and the other end of the spring abutting against a diaphragm retainer 61 suitably fixed to the diaphragm as by means of a fastener 62 extending through central apertures in the retainer 61 and diaphragm 54.

The pressure chamber 57, the right-hand chamber as seen in FIG. 2, is open to the atmosphere by means of the central aperture therein through which the fastener 62 and beaded chain 31, which is connected at one end to the fastener, protrude, while the vacuum chamber 56, the left-hand chamber, is connected, via the hose 44 and the vacuum switches 34 and 33, to a source of intake manifold vacuum pressure, as by having the inlet side of the vacuum switch 33 connected by hose 36 with the induction fluid in the intake manifold 14 of the engine.

Vacuum switches 33 and 34, which are similar in construction, each includes a valve casing made of two generally cup-shaped casing halves or members 65 and 66 which have flanges 67 and 68, respectively, between which the periphery of a flexible diaphragm 70 is interposed, a portion of the flange 68 being turned over the flange 67 to retain these elements in unit assembly. The central portion of the diaphragm 70 is sandwiched between retainers 71 and 72 that are suitably fixed to the diaphragm for axial movement therewith.

The diaphragm 70 in each switch divides the housing into two chambers, one of which is a pressure chamber 73 connected by port 66a in the casing member 66 to the atmosphere, the left-hand chamber as seen in FIG. 2, and a vacuum chamber 74 and, the diaphragm is normally biased to the left as seen in this figure by means of a coiled switching spring 75, one end of the spring 75 abutting against the retainer 71 and the other end of the spring abutting against a wall of the casing 65.

The chamber 74 of vacuum switch 33, the right-hand chamber as seen in FIG. 2, is provided with the inlet conduit 35 connected by hose 36 to the source of engine intake manifold vacuum pressure, in a manner previously described. The chamber 74 of vacuum switch 33 is also connected by the outlet conduit 37 and conduit 38 to the chamber 74 of vacuum switch 34, one end of conduit 38 thus serving as the inlet for vacuum switch 34. As seen in this same figure, the conduit 37 serving as the outlet for vacuum switch 33 extends through the casing 65 of vacuum switch 33 into the chamber 74 thereof, the end of this conduit 37 terminating in a reduced diameter control orifice end 37a, of a predetermined size, with flow therethrough being controlled by the movement of the retainer 71 of vacuum switch 33, the retainer 71 moving with the diaphragm 70. Thus, the retainer 71 also serves as a valve member that is adapted to seat at the inboard or orifice end 37a of conduit 37 within the vacuum switch 33.

In a similar manner, the chamber 74 of vacuum switch 34 is also provided with an inlet, as part of the conduit 38, previously described. Chamber 74 of vacuum switch 34 is also connected by the outlet conduit 42, conduit 43 and hose 44 to the vacuum chamber 56 of the vacuum motor 30, the outlet conduit 42 extending through the casing 65 of the switch 34 into the chamber 74 thereof. As shown in FIG. 2, the end of outlet conduit 42 terminates in a reduced diameter control orifice end 42a of a predetermined size, flow through which is controlled by the retainer 71 fixed to move with the diaphragm 70 of the vacuum switch 34, whereby the retainer 71 of this switch serves as a valve member that is adapted to seat at the inboard or orifice end 42a of conduit 42.

In the operation of the throttle motion control device of the subject invention, engine manifold vacuum supplies the control signal through the vacuum switches 33 and 34, in a manner to be described, to provide the operational energy for this device. By proper sizing of the various orifices of this system and by proper sizing of the spring forces, for example, in the vacuum switches 33 and 34, and the size of the vacuum motor and the force of its spring 58, one can control the vacuum pressure in inches of mercury, hereinafter referred to as inches Hg, at which the vacuum motor will be actuated and the force applied by this vacuum motor against the accelerator pedal. In a particular embodiment, the vacuum switch 33 was adapted to be closed at vacuum pressures above 9 inches Hg and to open at about 9 inches Hg and to remain open at vacuum pressures less than 9 inches Hg. The vacuum switch 34 in this embodiment was adapted to remian closed at vacuum pressures above 3 inches Hg and to open at 3 inches Hg. In addition, in this particular embodiment of the control device, the opening in orifice 40 was of, for example, 0.050 inch diameter, the bleed orifice 41 had an opening of, for example, 0.010 inch diameter, the orifice 45 as of, for example, 0.090 inch diameter and the bleed orifice 46 was of, for example, 0.020 inch diameter. The diameter of the control orifice ends 37a and 42a can be identical in size and were of a diameter substantially greater than the diameter of orifice 40 or orifice 45.

During engine shut-down condition, there would, of course, be no manifold vacuum pressure in the chamber 74 of both vacuum switches 33 and 34, the pressures in these chambers being substantially at atmospheric pressure and, accordingly, with atmospheric pressure being present in the chambers 73 of these switches, the springs 75 of these switches would cause axial movement of their respective cooperating diaphragms in a direction at which the retainers 71 would be unseated from the orifice ends 37a and 42a, respectively, of the switches 33 and 34. Under these conditions, and in view of the presence of the bleed orifice 46, substantially atmospheric pressure would be present in the chamber 56 of the power unit 30 so that the spring 58 thereof would bias the diaphragm 54 to the position shown in FIG. 2. In this position of the diaphragm 54, sufficient slack would exist in beaded chain 31 between the diaphragm and the pivot lever 24 to permit full clockwise pivotal movement of the accelerator pedal 20 to effect full opening movement of the throttle 15.

The housing of the power unit 30 is properly sized so as to permit sufficient movement of the diaphragm 54, when a predetermined vacuum pressure is applied to the chamber 56, so that the slack in the beaded chain 31 will be taken up to permit a force to be exerted by the power unit 30 on the pivot lever 24 in a direction to oppose the driver's movement of the accelerator pedal 20 in the direction to effect opening of the throttle valve 15.

During engine operation, the chamber 74 of vacuum switch 33 would have substantially the same pressure therein as the vacuum pressure in the intake manifold 14 because of the direct connection through the conduit 35 and hose 36 of these units. During steady state driving conditions, the vacuum switch 33 would be closed due to the high manifold vacuum in excess of 9 inches Hg existing in the chamber 74, the pressure differential on opposite sides of the diaphragm 70 of this switch then causing the diaphragm to move to the position shown in FIG. 2 against the biasing action of the spring 75 to block flow through the orifice end 37a of the conduit 37. At this time, the vacuum switch 34 would be open with the pressure in the chamber 74 of vacuum switch 34 and in the chamber 56 of the vacuum motor 30 being at or substantially at atmospheric pressure due to the presence of the air bleeds 46 and 41 in the conduits 43 and 38, respectively, and due to the fact that vacuum switch 33 is closed.

When engine manifold vacuum is decreased to a vacuum pressure of 9 inches Hg or less, in the embodiment described, by further opening of the throttle 15 as during acceleration, the vacuum switch 33 would then open as biasing by the spring 75 of this switch, the diaphragm 70 with the retainer 71 carried thereby then moving in a direction, to the left with reference to FIG. 2, to have the retainer 71 unseat from the orifice end 37a thus placing the vacuum chamber 74 of vacuum switch 33 in communication at a controlled rate by orifice passage 40 in conduit 38 with the chamber 74 of vacuum switch 34. Since it will take some time for a vacuum pressure greater than 3 inches Hg to be pulled in this switch, the switch 34 at this reduced vacuum pressure would remain open, and the chamber 56 of the vacuum motor 30 can now receive a vacuum signal of predetermined value as controlled by the setting of the vacuum switch 34, which thus acts as a vacuum control valve or pressure switch. The vacuum motor 30 is thus actuated to apply, through its bead 31 connection to the pivot lever 24, a force against the accelerator pedal 20, this force being approximately 9 pounds maximum in the embodiment described, and as shown in the graph of FIG. 3, because of the setting of vacuum switch 34, to effect its closing as the vacuum pressure therein reaches 3 inches Hg or higher.

If at this time the driver maintains the original force previously applied on the accelerator pedal, which force was in balance with the normal accelerator return spring 21 to effect the desired opening of throttle 15, the added force applied by the vacuum motor 30 will, in effect, cause the accelerator pedal 20 to return, in a counterclockwise direction with reference to FIG. 1, thereby moving the throttle 15 toward the closed position. This will then result in an increase in the pressure differential in the intake manifold to the point of economical operation, that is, it will maintain engine vacuum pressure slightly below a predetermined value, which will be a vacuum pressure slightly below 9 inches Hg. As this occurs, the vacuum switch 33 will close partially to maintain a level of vacuum in switch 34 and actuator 30 sufficient to balance the excessive pedal force applied.

If, however, the operator wishes, for some reason, to override this signal, he can then apply a sufficient force on the accelerator pedal 20 to override the force applied by the vacuum motor 30 to the pivot lever 24, thereby causing the pivot lever to move in a throttle opening direction, a direction which will then cause the pressure differential in the intake manifold to decrease, to thereby effect an increase in the vacuum pressure in the chamber 74 of the vacuum switch 34 to a value at or above 3 inches Hg, the closing pressure for this switch. This will thereby cause the vacuum switch 34 to close and thereby remove the source of the vacuum signal to the vacuum motor 30. Pedal force of the vacuum motor 30 will then bleed away, as shown graphically in FIG. 3, as atmospheric air bleeds through the bleed orifice 46 to the chamber 56 of the vacuum motor 30.

If then, during continued acceleration of the engine, manifold vacuum will be further decreased, the vacuum switch 33 remaining open at vacuum pressures below 9 inches Hg, the vacuum switch 34 will then reopen at 3 inches Hg vacuum pressure to again effect actuation of the vacuum motor 30 to provide a secondary hard pedal warning force which will also decrease, if overridden by the operator effecting full throttle opening of the throttle 15, due to the loss of manifold vacuum to power the system.

The vacuum motor 30 will always provide, in the embodiment described, about 9 pounds maximum force since it will only receive a vacuum signal of about 3 inches Hg vacuum pressure in the chamber 56, which pressure will be uniform for both the primary and secondary warning signals since the vacuum switch 34 will prevent a higher vacuum pressure from reaching the vacuum motor. Thus, it will be seen that the vacuum switches 33 and 34 are, in effect, pressure switches or vacuum control valves that are open or closed depending upon the pressure differential across the diaphragm in each of these switches and the force of the respective spring 75 in each of these switches.

The orifice sizes in the embodiment of the throttle motion control device described are not critical. However, it should be realized that it is necessary to keep the size of the orifice 45 significantly larger than the size of the orifice 40 to assure the same vacuum level in both the vacuum switch 34 and the vacuum motor 30 when the vacuum switch 34 is open, since it is desirable to have the vacuum switch 34 close, based on the vacuum motor 30 vacuum level. The bleed orifice 41 is sized to provide bleed down of vacuum switch 34 when manifold vacuum is increased and need not be a large opening. The bleed orifice 46 should be sized to provide a fairly slow pedal force fade-away, for example, 1 second to 4 seconds to effect fade-away of the pedal force.

Thus, in operation, the subject throttle motion control device presents a primary solid-wall feel or signal on the accelerator pedal when the driver is accelerating at a predetermined vacuum level corresponding to a lower economical rate of fuel consumption. This primary solid-wall feel can, however, be overridden by the vehicle operator, if desired, with the subject control device then presenting a secondary solid-wall feed on the accelerator pedal to indicate to the driver that he is accelerating at another predetermined vacuum. However, it will be realized that the accelerator pedal has no added load applied thereagainst by the subject device when the engine is operating economically, when operating between predetermined engine vacuum levels corresponding to different predetermined rates of fuel consumption or when operating at full throttle.

What is claimed is:

1. A throttle motion control device for an internal combustion engine having an induction system including a movable throttle for controlling flow through an induction passage and a manually actuated throttle control means operatively connected to the throttle to effect opening movement of the throttle, said throttle motion control device including a pneumatic power unit having a housing divided into a first chamber and a second chamber by a movable wall, said second chamber being in communication with the atmosphere, a flexible power connector operatively connected at one end to said movable wall and at its other end to said throttle control means, a first vacuum switch having an inlet and an outlet, said inlet being connected to said induction passage downstream of said throttle, a second vacuum switch having an inlet and an outlet, a first conduit means connecting said inlet of said second vacuum switch to said outlet of said first vacuum switch, said first conduit means including a first orifice controlling flow through said conduit means and a first bleed orifice to the atmosphere positioned between said first orifice and said second vacuum switch, a second conduit means connecting said outlet of said second vacuum switch to said first chamber, said second conduit means having a second orifice therein to control flow through said second conduit means and a second bleed orifice to the atmosphere positioned between said second orifice and said first chamber, said first vacuum switch and said second vacuum switch each being operable at selective predetermined inlet vacuum pressures to apply vacuum pressure in said first chamber whereby said power unit is actuated to apply a force of predetermined value to said throttle control means in a throttle closing direction.

2. A throttle motion control device according to claim 1 wherein the diameter of said second orifice is substantially greater than the diameter of said first orifice and wherein said second vacuum switch is operable to open at a predetermined vacuum pressure less than the predetermined vacuum pressure effecting opening of said first vacuum switch.

3. A throttle motion control device for an internal combustion engine having an induction system including a movable throttle for controlling flow through an induction passage and a manually actuated throttle control means operatively connected to the throttle to effect opening movement of the throttle, said throttle control device including a pneumatic power unit having a housing divided into a first chamber and a second chamber by a movable wall, said second chamber being in communication with the atmosphere, a spring positioned in said first chamber to normally bias said movable wall in a direction to reduce the volume of said second chamber, a flexible power connector operatively secured at one end to said movable wall and at its other end to said throttle control means, and conduit means, including a first vacuum switch and a second vacuum switch, connecting said first chamber to said induction passage downstream of said throttle, said conduit means including, in succession, said first vacuum switch connected to said induction passage and operable to open at a predetermined vacuum pressure, a first conduit means having a flow control orifice therein and a bleed orifice open to the atmosphere connected at one end to said first vacuum switch with said flow control orifice positioned between said first vacuum switch and said bleed orifice, said second vacuum switch connected to the opposite end of said first conduit means and operable to open at a predetermined vacuum pressure less than the predetermined vacuum pressure of said first vacuum switch, and a second conduit means, including a second flow control orifice therein and a second bleed orifice open to the atmosphere, connected between said second vacuum switch and said first chamber, said second flow control orifice being positioned between said second vacuum switch and said second bleed orifice.

* * * * *